United States Patent [19]

Brower

[11] 4,069,407
[45] Jan. 17, 1978

[54] UNDERWATER CUTTING ROD

[76] Inventor: Jerome S. Brower, 2040 N. Towne Ave., Pomona, Calif. 91767

[21] Appl. No.: 639,289

[22] Filed: Dec. 10, 1975

[51] Int. Cl.² .......................... B23K 7/00; B23K 9/00
[52] U.S. Cl. ........................................ 219/70; 219/72; 219/145.1; 266/48
[58] Field of Search .................... 219/121 P, 145, 70, 219/68, 69 R, 72; 228/241; 149/2; 266/48; 148/9 R; 110/1 R; 432/99

[56] References Cited
U.S. PATENT DOCUMENTS

| 2,802,930 | 8/1957 | Ronay | 219/70 |
| 3,260,076 | 7/1966 | Humberg | 431/99 |
| 3,507,230 | 4/1970 | Seib | 431/99 X |
| 3,507,231 | 4/1970 | Meier | 431/99 X |
| 3,591,758 | 7/1971 | Clucas | 219/70 |

OTHER PUBLICATIONS

Slottman G. V. & Roper E. H. *Oxygen Cutting*, First Edition, McGraw-Hill Book Co., 1951, pp. 143-145.

Primary Examiner—Roy Lake
Assistant Examiner—Paul A. Bell
Attorney, Agent, or Firm—Roylance, Abrams, Berdo & Kaul

[57] ABSTRACT

Applicant's invention relates to a new and novel concept in underwater cutting of metals and nonmetals. It utilizes a binary metallic system in conjunction with an ionized gaseous cone to provide a continuous cutting action of high temperature, extreme power, and with great intensity.

6 Claims, 4 Drawing Figures

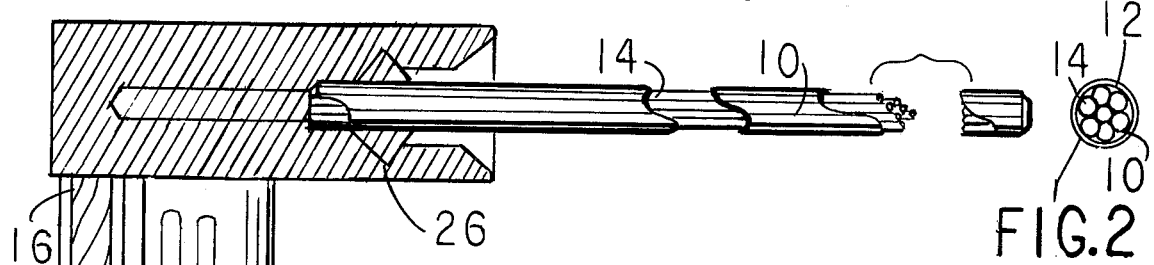
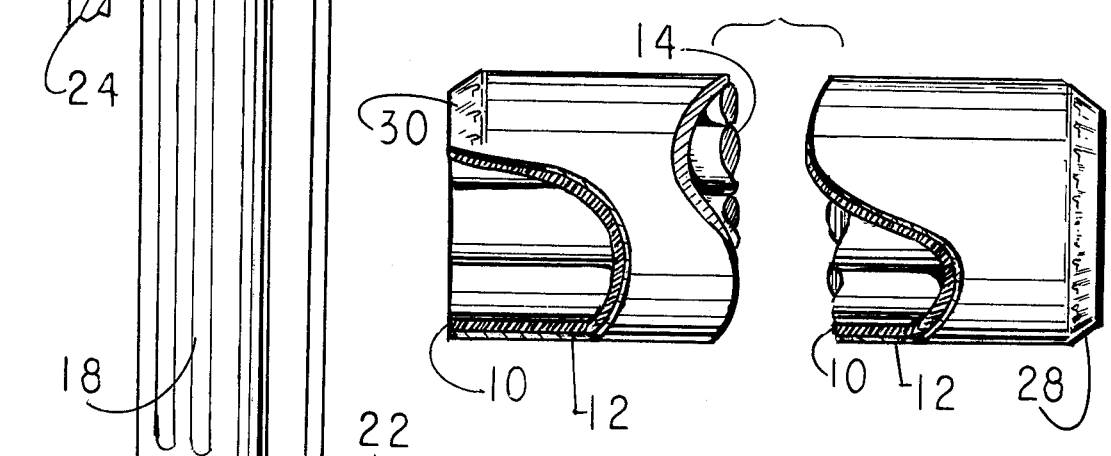
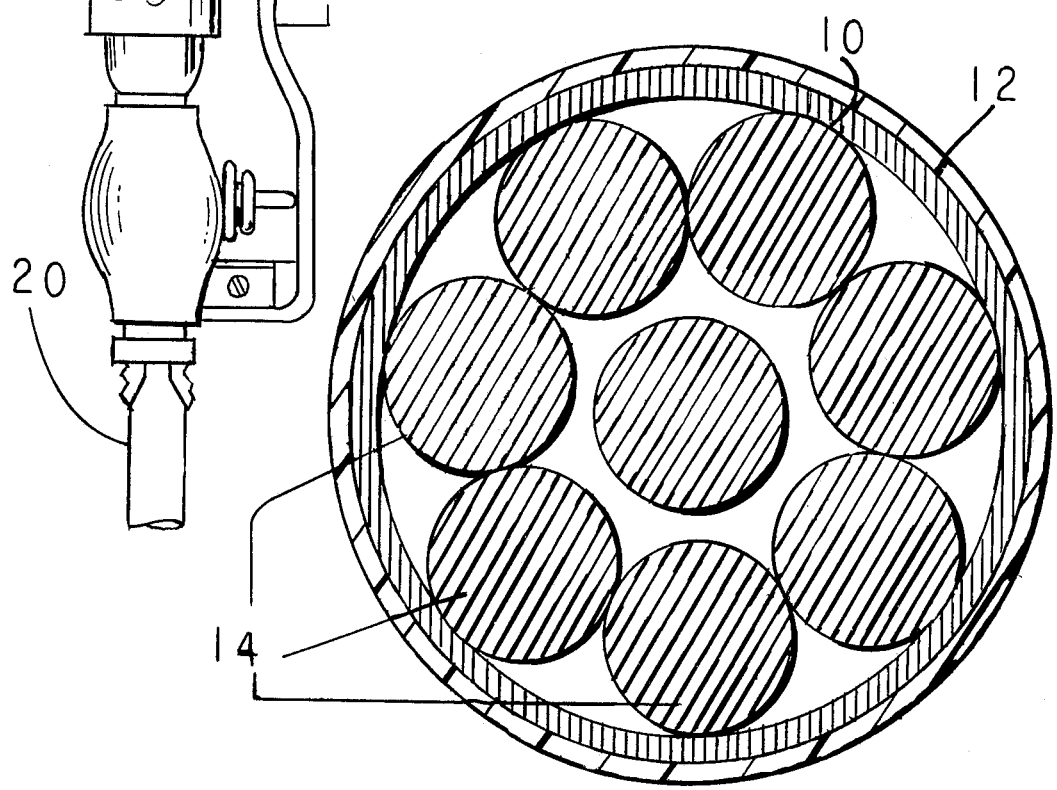

UNDERWATER CUTTING ROD

BACKGROUND OF THE INVENTION

Electric arc cutting and welding torches are well known in the art. Such devices as commonly used on the surface are adapted for underwater use in the salvaging of sunken vessels and drill platforms; repairing ships, and in the construction and maintenance of subsea structures.

Cutting Torches as presently used underwater, have particularly severe problems in cutting nonferrous metals, stainless steels and nonconductive substances such as cement, concrete, bitumens, barnacles and other marine growth. Maintaining a continuous arc underwater, at any depth, is impossible when the material to be cut is non-conductive. The present generation of arc cutting rods will not penetrate or cut through non-conductive materials. Present arc-oxygen systems cannot function without a power source. Where the power is removed, the arc extinguishes itself, and the rod will not sustain itself in burning. Available arc-oxygen units cannot cut through non-conductive materials.

The arc-oxygen method of cutting metals is based on the same principle as that employed in oxy-acetylene cutting. In the latter, the metal is first locally preheated to incandescence by means of the oxy-acetylene flame. When incandescence is reached, a high velocity jet of oxygen is impinged upon the preheated spot. The oxygen jet performs the double duty of oxidizing or burning the core of the preheated portion and removing the products of combustion. The oxy-acetylene flame continuously advances the incandescent spot in preparation for the action of the oxygen stream. In arc-oxygen cutting, preheating is performed by the electric arc maintained between the material being cut and the electrode. Since the heat energy available in an arc is much greater than that of an oxy-acetylene flame, preheating with the arc-oxygen method is practically instantaneous. Therefore, the instant the arc is struck, the high velocity oxygen stream is admitted to impinge upon the preheated spot where the same phenomena occur as given for the oxy-acetylene cutting. Advancing the electrode along the intended line of cut while the electric arc is continuously maintained, results in the uninterrupted succession of preheat, oxidation and removal of the burned metal.

SUMMARY OF THE INVENTION

The primary object of this invention is to effectively provide an underwater cutting rod which will solve the problems described above.

It is the further object of this invention to provide a cutting rod and system which is far superior to any previously used in the art. In addition, it is an object to provide a rod which is light-weight, readily adaptable to most standard rod holders, easy to handle and use, which develops an arc under any non-explosive atmosphere including water, and develops temperatures high enough to melt any known metal, mineral or combination of metals and minerals.

It is a further object of this invention to provide an underwater cutting rod which will maintain ultra-high temperatures and continue to burn under water without the continuous presence of an electrical current.

These and other objects will be described by the accompanying description and drawings in which:

FIG. 1 shows the torch handle and rod of this invention,
FIG. 2 is an end view of the rod,
FIG. 3 is a side elevation of the rod,
FIG. 4 is a cross-section on lines A-B of FIG. 3.

Referring first to FIG. 4, there is shown an outer shell 10 which is made of a light-weight steel tubing which provides the outer casing of the cutting rod. Tube 10 is coated with a plastic material 12 such as epoxy, vinyl, acrylic or urethane which acts as an insulative and protective coating to the tube 10. The coating 12, by its insulating qualities prevents side-rod sticking as well as side-rod blowout.

Located inside the metallic tube 10 is a plurality of rods 14, which are a mixture of metals. Some are steel and some are aluminum. The preferred ratio of steel rods to aluminum rods, which are clustered together within the steel tube 10, is approximately 7 to 1. The cutting rod will provide satisfactory results in a ratio of 3 to 1 to 10 to 1; however, the highest temperatures and best burning results are obtained with a ratio of steel to aluminum rods of 7 to 1. The aluminum may be substituted by magnesium, titanium or alloys of magnesium, aluminum or titanium, however aluminum is preferred.

Referring now to FIG. 1 there is shown the torch handle or holder 16 used to hold and supply electrical energy and oxygen to the tube 10. The handle 16 comprises a body handle 18 into which passes a gas inlet tube 20. This gas is usually oxygen although other gases may be used for certain results. A gas flow control handle 22 controls the volume of gas passing through the handle 18 and is operated by the person using the torch.

An electrical input line 24 provides a means to bring electrical energy to the tube 10. The gas passes through a valve inside of a collet 26 and enters under pressure through the metal rods 14 in tube 10.

Oxygen is passed through the steel tube 10, longitudinally at pressures varying from 55psig to 200psig along the axis of the cluster of rods 14, the oxygen passing through the spaces between the rods.

The purpose of this gaseous medium is to provide an oxidizing envelope at the tip of the tube 10, and aid in its complete combustion, as well as blowing away the slag. It elevates the temperature to the white heat range and provides a gaseous cone for the ionized arc to form. Methods to provide the introduction of oxygen to the rods through tube 10 are well known in the art.

An electrical current from 30 to 600 amperes, emanating from a generator such as a conventional welding machine, and passing through the torch handle, is introduced to the cutting tube 10 through line 24. This current is used to strike an arc at the end of the tube 10, between the rod itself and the work surface under water. It ignites the cutting rod and establishes the ionized gaseous cone simultaneously. At this point, temperatures are developed which are high enough to melt metals, alloys, minerals in their natural state, and concrete. The rod will melt these materials underwater, at any working depth and on dry land at all altitudes. The electrical current may be applied to the tube 10 and the individual rods 14, on a continuous basis, during its operation, or shut off once the tube 10 ignites. It will sustain burning with or without the current. The tube 10 in conjunction with the feedthrough oxygen, burns at about 5,432° Fahrenheit. The burning tip is not quenched by the water. The tube 10 as set forth in this invention, will easily cut or burn through concrete, steel or brass under water.

When used to burn through electrically nonconductive material such as coral, concrete, pipe covering or any marine growth, a conductive starter plate is required. It is simple grounded contact plate which is placed on the subject target to complete the circuit when the power is supplied. When the arc is struck, it ignites the tube at the tip. The burning is sustained by the continuous flow of oxygen and is then moved to the subject target and melting and cutting begin. Removing the rod from the starter plate does not extinguish the flame. This unusual characteristic allows for cutting through non-conductive substances. This invention provides a continuous process which consumes the rod at the point of contact, which results in the super-elevated temperatures. The transfer of this heat from the tube to the subject, results in a lava-like melt and subsequent flow of molten materials away from the point of contact.

Electric arcs, the region where a sharply focused energy beam heats a solid surface, and the impact region on a solid surface of a high-intensity, high-energy particle beam, all have one important feature in common. This is the concentration of energy per particle, in a small region, much higher than the conventional equipartition energy at normally obtainable temperatures. This is achieved by utilized the method of concentrating energy in the region at a rate far greater than it can be removed by the ordinary processes of heat removal such as conduction, convection, or radiation. The result is the creation of a highly excited region which can be viewed in many cases of interest as a dense superheated plasma.

In addition, this invention provides a continuous thermitic reaction cone at the point of work. As stated, the temperature within the cone is approximately 5,432° F.

The classic thermite reaction consists of 8 moles of aluminum plus 3 moles of magnetic iron oxide. The reaction to completion produces 4 moles of aluminum oxide plus nine moles of molten iron. When ignited, this mixture produces an enormous quantity of heat, namely 758,000 calories per gram molecular weight. this heat is sufficient to raise the temperature of the region to 5,432° F.

$$8\ AL + 3\ FE_3.O_4 \rightarrow 4\ AL_2O_3 + 9\ FE$$

the rod of the present invention is completely consumed during the operation; thus, no waste product is developed which would cause environmental problems in the use of the device.

When a chemical reaction is subjected to an electric current, or conducted within an electric field, different results are observed and can be attained, depending on the nature of the substances, than normally observed. The extent of chemical change is dependent, in each case, upon the amount of current which passes.

It has been noted and recorded that the application of current during the cutting operation increases the efficience of the system by as much as 25%. When the current is removed, the tube continues to burn underwater with sufficient energy to cut all of the materials stated above. Variations of current from 30 amperes to 600 amperes appear to be the most efficient range of operation depending upon the thickness and thermal conductivity of the target material.

The tube 10 and rods 14 of this invention are completely consumed during its operation. The rods of the present invention 14, contained within the tube 10, are used in a diameter of approximately 0.094 inches, although diameters of 0.031 through 0.25 inches may be utilized. However, diameters of approximately 0.094 are considered best. There is no flux contained within the rods or tube of the present invention, and there is no packing between the steel and aluminum rods.

The tube 10 may range from about 0.18 inches in diameter to about 0.75 inches in diameter with a diameter of about 0.375 inches considered best. The thickness of the plastic coating 12 is not critical and thicknesses of about 0.01 to about 0.1 inches is normal.

Referring now to FIG. 2 there is shown an end view of the tube 10 with the rods 14 and the plastic coating 12.

FIG. 3 shows the tube 10 with the rods 14 clustered within. The ends 28 and 30 of rod 10 are crimped to hold the rods in the tube 10.

Various tests were made with rods of the present invention to determine cutting time and performance characteristics. A chart showing the results follows. The tests were done at a 5 to 15 foot depth of water cutting anchor chain or steel plate.

Having thus described the invention it is requested that the patent be limited only by the scope of the appended claims.

| | | | ULTRA-THERMIC CUTTING ROD | | | |
| | | | (Depth of Test: 5 to 15 Feet) | | | |
| Insulative Coating | Amps | Oxygen Pressure | Metal Size & Type | Coating Adherance | Cutting Ability | Time Min. |
| --- | --- | --- | --- | --- | --- | --- |
| | 1  135 200 | 80 psi | 1" chain Heavy Rust | Good | Cut 1 Link | |
| | 2  200 | 60 | " | " | Cutting ability reduced | 1.05 |
| Extruded Vinyl Coating .015 in. | 3  200 Amps to start | 75 only | " | " | Cut 1 & ¾ Links | 1.05 |
| | 4  200 | 75 | " | " | ½ Link | .98 |
| | 5  200 | 75 | " | " | Cut 2 Links | 1.06 |
| | 6  200 | 75 | Aluminum | Good | Cut in excess of 8" of ¼ in Plate | 1.13 |
| | 7  200 | 75 | Brass Pipe Coupling | Good | Very little Penetration | 1.21 |
| | 8  300 | 80 | Brass Pipe Coupling | Good | Cut 1.5 in | .80 |
| | 9  300 | 80 | " | Good | Cut 1.5 in | 1.10 |
| | 10  300 | 80 | 1"Stainless Steel Rod | Good | Cut Good-completed cut with ⅜ of rod | 1.32 |
| | 11  300 | 80 | ½" Mild Steel Plate | Good | Cut 6" | 1.42 |

-continued

ULTRA-THERMIC CUTTING ROD
(Depth of Test: 5 to 15 Feet)

| Insulative Coating | Amps | Oxygen Pressure | Metal Size & Type | Coating Adherance | Cutting Ability | Time Min. |
|---|---|---|---|---|---|---|
|  | 12 300 | 95 | " | Good | Cut 8" | 1.40 |
| Ceramic | 1 300 | 95 | 8" Mild Steel | Bad Electrolysis Causes coating to fall off | Cut is good but by the end of cut the coating offers no insinulations and rod arcs through side | .86 |
| Ceramic | 2 300 | 95 | ½ Mild Steel | Bad Electrolysis causes coating to fall off | Cut is good but by the end of the cut the coating offers no insinulation and Rod arcs through side. | 1.09 |
|  | 3 300 | 95 | ½" Mild Steel | " | " | .60 |
| Slurry Ceramic | 1 300 | 95 | ½" Mild Steel | Good | Good cut 8" coating is too thick and does not consume with the rod. Coating often extends beyond rod when burning. | 1.32 |
|  | 2 300 | 95 | ½" Mild Steel | Good | " | 1.28 |

I claim:

1. A cutting torch primarily for underwater use in which electrical current and reactive gas flow are used in combination to cause progressive burning of a metallic electrode, the torch comprising
   a metallic electrode comprising
      a metallic tube;
      a plurality of ferrous metal rods within said tube;
      at least one rod made of a metal selected from the group consisting of aluminum, magnesium, titanium and alloys thereof disposed within said tube; and
      a layer of insulating material substantially covering the exterior surface of said tube;
   means for connecting a source of electrical current to said tube and for supplying current substantially continuously thereto; and
   means for connecting a supply of reactive gas to said tube.

2. A torch according to claim 1 wherein the ratio of steel rods to aluminum rods is between about 3 to 1 and about 10 to 1.

3. A torch according to claim 1 wherein the ratio of steel rods to aluminum rods is 7 to 1.

4. The device of claim 1 where the tube is crimped at each end to hold the rods disposed within.

5. The device of claim 1 wherein the gas supplied is oxygen at a pressure of from about 55 psig to about 200 psig.

6. The device of claim 1 wherein the electrical current supplied is in the range of from about 30 to about 600 amperes.

* * * * *